H. L. BEUCLER.
POTATO CUTTER.
APPLICATION FILED OCT. 4, 1921.

1,422,731.

Patented July 11, 1922.
2 SHEETS—SHEET 1.

Harvey L. Beucler
INVENTOR

BY Victor J. Evans
ATTORNEY

WITNESS:

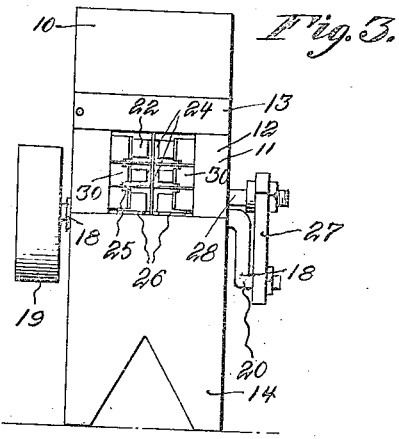
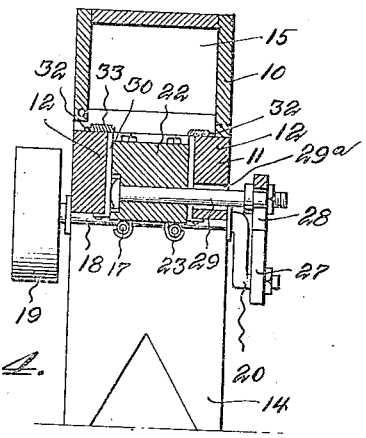
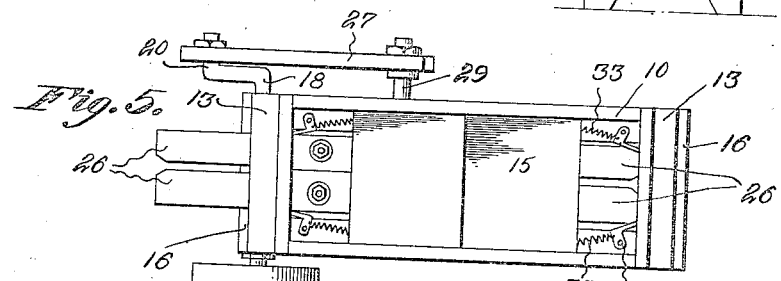
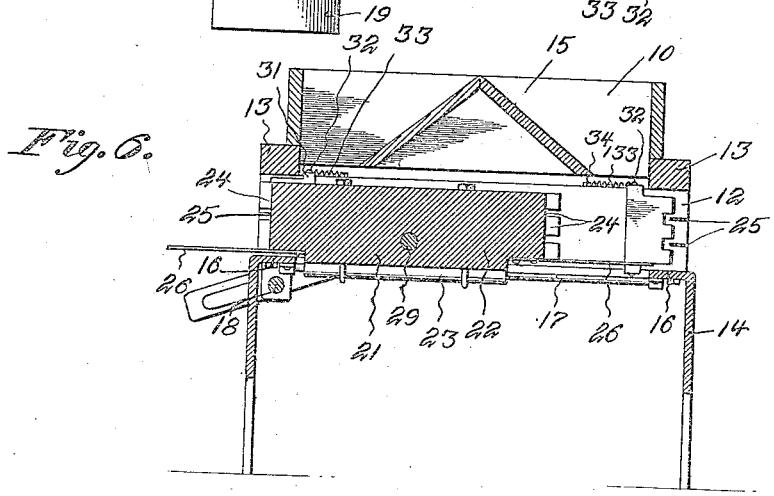

UNITED STATES PATENT OFFICE.

HARVEY L. BEUCLER, OF LAKE PARK, MINNESOTA.

POTATO CUTTER.

1,422,731.　　　　Specification of Letters Patent.　　Patented July 11, 1922.

Application filed October 4, 1921. Serial No. 505,275.

*To all whom it may concern:*

Be it known that I, HARVEY L. BEUCLER, a citizen of the United States, residing at Lake Park, in the county of Becker and State of Minnesota, have invented new and useful Improvements in Potato Cutters, of which the following is a specification.

This invention relates to potato cutters, and has for its object the provision of a power driven device for cutting potatoes into a plurality of pieces for the purpose of providing seed or for any other purpose desired, the principal advantage of the device being the rapidity with which the work may be accomplished.

An important and more specific object is the provision of a potato cutter which is power driven and which includes a casing having its ends formed substantially as dies consisting of intersecting knives or strips, the potatoes to be cut being fed to the device and being pressed against and consequently cut by the dies by the rapidly reciprocating plunger.

An additional object is the provision of mechanism of this character which will be very simple and inexpensive in manufacture, easy to operate, not likely to get out of order, efficient in service, durable in use, and a general improvement in the art.

With the above and other objects and advantages in view, the invention consists in the details of construction to be hereinafter more fully described and claimed and illustrated in the accompanying drawings in which—

Figure 3 is an end view,

Figure 4 is a cross sectional view,

Figure 5 is a plan view, and

Figure 6 is a horizontal sectional view.

Figure 1:
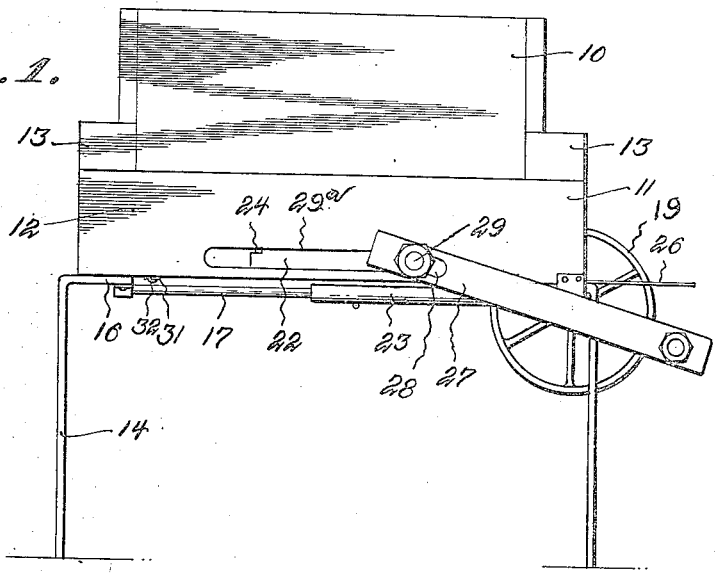
Figure 1 is an elevation of one side of the device.
Figure 2:
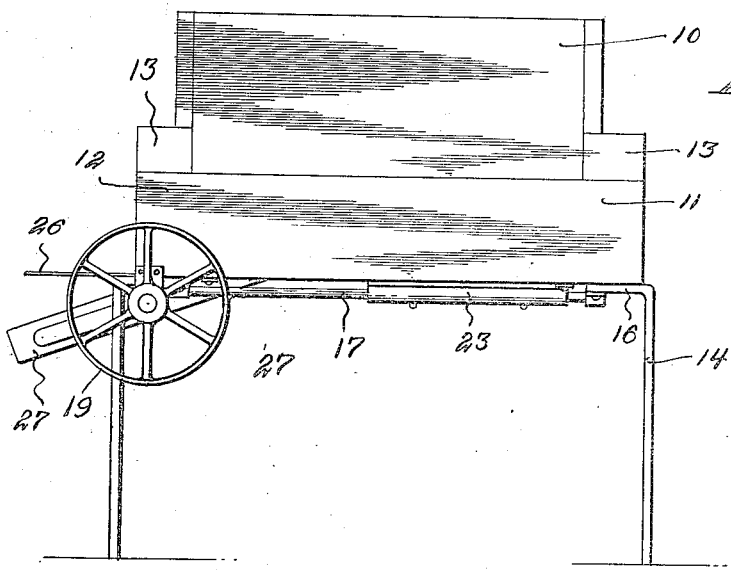
Figure 2 is an elevation of the opposite side.

Referring more particularly to the drawings, I have shown my device as comprising a hopper 10 mounted on top of a rectangular frame 11 which includes sides 12 connected by cross bars 13. This frame 11 is supported upon suitable legs 14. The construction is such that the top of the hopper 10 is open, the bottom of the frame is open, and both ends of the frame are open. Located within the hopper is a V-shaped deflector 15 which is located centrally thereof and disposed above the frame 11. Secured to lower cross bars 16 which connect the ends of the sides 12 at their lower edges, are guide rods 17 which extend longitudinally of the frame 11.

Journaled transversely of one end of the frame is a shaft 18 which is provided at one end with a pulley 19 adapted to be driven by a belt which is in turn driven by any suitable power device, and which is provided at its other end by a crank 20. The numeral 21 designates a carriage which includes a block 22 movable longitudinally within the frame 11 and provided at its underside with tubular members 23 slidable upon the guide rods 17. The ends of the block 22 are formed with intersecting grooves 24 disposed opposite to and in position to conformingly engage upon or against intersecting die strips or blades 25 secured within the open ends of the frame 11. Secured to this block 22 are elongated strips or fingers 26 which are adapted to project beyond the ends of the frame when the carriage is moved by the means to be described.

In order to effect movement of the carriage, I provide a link bar 27 which is pivoted at one end upon the crank 20 and which has its other end formed with an elongated slot 28 through which passes a bolt 29 which passes through the block 22. One side of the frame is provided with an elongated slot 29$^a$ through which the bolt operates.

Located at the inner faces of the sides 12 of the frame, at the ends thereof, are upright plates 30 formed with ears or lugs 31 pivotally connected with the frame, as shown at 32, and connected with these lugs or ears are coil springs 33 which are also connected with suitable stationary pins or bolts 34 carried by the frame at the intermediate portion thereof. Normally, the springs 33 operate to hold the plates 30 in such position that they converge outwardly with respect to the ends of the frame.

The operation of the device is as follows:

The pulley 19, and consequently the shaft 18, is driven by any suitable means, whereupon the movement of the crank 20 will result in corresponding movement of the link bar 27 and this will cause the carriage 21 to move back and forth within the frame, the tubular members 23 being guided by the rods 17. The potatoes to be cut are poured into the hopper 10 and owing to the provision of the V-shaped deflector 15, will be caused to pass to the ends of the frame 11. As the carriage is reciprocated, as above described, the ends of the block 22 will engage a certain number of potatoes and force them against the die blades 25, the pivoted spring-pressed plates 30 operating to press the potatoes from the side so that they will be presented to the die blades in compact formation. Owing to the fact that the ends of the block 22 are grooved for the accommodation of the die blades 25, it will be apparent that the potatoes will be positively cut as they are forced through the die blades or strips. As the block 22 is retracted from the die blades at either end of the frame, the fingers 26 associated with the block will operate to prevent the potatoes from falling through the frame. As the carriage makes its opposite stroke the fingers 26 are retracted which will cause the cut pieces of potatoes to be scraped off so that they may fall into any convenient receptacles placed at the ends of the device. As both ends of the device are the same it will be apparent that there will be a cutting action at both ends so that there are no idle strokes.

From the foregoing description and a study of the drawings it will be apparent that I have thus provided a simply constructed and easily operated and installed power driven device whereby a great quantity of potatoes may be cut into pieces in a remarkably short space of time. Owing to this fact it will be readily apparent that the device will be a great time and labor saver in cutting potatoes intended for seed. Furthermore, owing to the fact that there are no adjustments provided, there is nothing to get out of order and the device will consequently have an unusually long life.

While I have shown and described the preferred embodiment of my invention, it is of course to be understood that I reserve the right to make such changes in the form, construction and arrangement of parts as will not depart from the spirit of the invention or the scope of the subjoined claims.

Having thus described my invention, I claim:

1. A device of the character described comprising a frame open at its top, bottom and both ends, supports secured to the ends of the frame, a hopper mounted upon the top of and discharging into said frame, a plurality of intersecting blades within the open ends of the frame and constituting dies, a carriage mounted for reciprocatory movement within the frame and including a block having its ends grooved for accommodation of the die blades, means for reciprocating said carriage, tubular members secured upon the underside of the carriage, and guide rods secured beneath the frame and passing through said tubular members.

2. A device of the character described comprising a frame open at its top, and bottom, a hopper mounted above and discharging into said frame, a plurality of intersecting die blades at the ends of said frame, a carriage slidable longitudinally of said frame and adapted to engage said die blades, means for imparting reciprocatory movement to said carriage, said means comprising a shaft journaled transversely of the frame and having one end provided with a pulley and the other end formed with a crank, a link bar pivoted upon said crank and formed with a longitudinal slot, a member secured to the carriage, movable along a slot in the side of the casing and engaged within the slot in the link bar, and fingers secured to said block and forming the bottom for the frame, said fingers projecting beyond the end of the frame at the limit of movement of the carriage.

In testimony whereof I affix my signature.

HARVEY L. BEUCLER.